US007925359B2

(12) United States Patent
Sakamoto et al.

(10) Patent No.: US 7,925,359 B2
(45) Date of Patent: Apr. 12, 2011

(54) AIR COMPRESSOR AND WORK MANAGEMENT DATA COLLECTION SYSTEM

(75) Inventors: Gorou Sakamoto, Tokyo (JP);
Nobuyuki Nobe, Tokyo (JP); Shinichi Ohkubo, Tokyo (JP)

(73) Assignee: Max Co., Ltd., Tokyo (JP)

( * ) Notice: Subject to any disclaimer, the term of this patent is extended or adjusted under 35 U.S.C. 154(b) by 389 days.

(21) Appl. No.: 11/884,463

(22) PCT Filed: Feb. 15, 2006

(86) PCT No.: PCT/JP2006/302657
§ 371 (c)(1),
(2), (4) Date: Aug. 16, 2007

(87) PCT Pub. No.: WO2006/088061
PCT Pub. Date: Aug. 24, 2006

(65) Prior Publication Data
US 2009/0210294 A1    Aug. 20, 2009

(30) Foreign Application Priority Data
Feb. 18, 2005    (JP) ................................ 2005-043123

(51) Int. Cl.
*G06F 11/34* (2006.01)
*G06F 9/44* (2006.01)
*G06F 17/50* (2006.01)
*F02B 49/00* (2006.01)
*B23B 31/117* (2006.01)
*G06K 7/10* (2006.01)

(52) U.S. Cl. ................... 700/1; 705/11; 705/7; 417/63; 408/226; 235/377

(58) Field of Classification Search .................. None
See application file for complete search history.

(56) References Cited

U.S. PATENT DOCUMENTS
6,968,605 B2 * 11/2005 Zamora ....................... 29/432
(Continued)

FOREIGN PATENT DOCUMENTS
| JP | 2-108879 | 4/1990 |
| JP | 11-193631 | 7/1999 |
| JP | 2001-90673 | 4/2001 |
| JP | 2003-214348 | 7/2003 |

(Continued)

OTHER PUBLICATIONS

JP2002373795, Abstract translation, 2004.*

*Primary Examiner* — Albert Decady
*Assistant Examiner* — Sunray R Chang
(74) *Attorney, Agent, or Firm* — Drinker Biddle & Reath LLP (57) ABSTRACT

An air compressor 1 is provided with a clocking mechanism and an RFID reader/writer 2, detects a time-in and a time-out etc. of a worker, and writes time data into an RFID tag 4 of a time card 3 held by a worker using the RFID reader/writer 2. The air compressor 1 is made to function as a time recorder in order to collect data necessary for management from the time card 3 of the worker. Also, a type of tool etc. used during works is written to the RFID tag 4 of the time card 3 using the RFID reader/writer. In this way, the air compressor 1 is made to function as a data collection terminal to collect data necessary for work management from the time card 3 of the worker.

6 Claims, 7 Drawing Sheets

U.S. PATENT DOCUMENTS

| | | | |
|---|---|---|---|
| 2003/0069815 A1* | 4/2003 | Eisenberg et al. | 705/32 |
| 2005/0128083 A1* | 6/2005 | Puzio et al. | 340/572.1 |
| 2006/0076385 A1* | 4/2006 | Etter et al. | 227/2 |
| 2006/0159533 A1* | 7/2006 | Zeiler et al. | 408/226 |
| 2006/0242927 A1* | 11/2006 | Gorzynski | 53/287 |

FOREIGN PATENT DOCUMENTS

| | | | |
|---|---|---|---|
| JP | 2003-337882 | | 11/2003 |
| JP | 2004-102482 | | 4/2004 |
| JP | 2004-116472 | | 4/2004 |
| JP | 2002373795 | * | 7/2004 |

* cited by examiner

AIR COMPRESSOR AND WORK MANAGEMENT DATA COLLECTION SYSTEM

TECHNICAL FIELD

The present invention relates to an air compressor used at a construction site or the like, and a work management data collection system employing the air compressor. More particularly, the invention relates to the acquisition of various data necessary for the management using the air compressor installed at a site where works are carried out, such as at a construction site, thereby allowing such data to be collected automatically.

BACKGROUND ART

At a residential construction site where a wooden house or the like is being built, normally, one or two construction workers are working. In such a small-scale construction site, a time recorder or the like could not be installed due to adverse conditions, such as lack of an installing space and power supply, so that any data necessary for managing working hours such as time-in and time-out recodes have been collected manually.

On the other hand, at a large scale construction site such as a construction site of a large building, there have been efforts for introducing work management software which employs a method such as CPM (Critical Pass Method) for optimizing the allocation of human and material resources etc. (for example, see JP-A-11-193631).

The work management software requires inputs of data indicating the allocation of human and material resources, and conventionally, those efforts to collect data and to input the collected data have been carried out manually.

Now, at a construction site, air compressors are installed in order to supply compressed air to pneumatic tools such as nailing machines, screwing machines and the like. Further, for anti theft purposes, there has been proposed an air compressor which requires an input of a given ID in order to be able to operate it (see JP-A-2004-116472, for example).

Furthermore, an air compressor capable of receiving an input of an ID code through wireless communication has also been proposed (see JP-A-2003-214348).

Collection of various data necessary for work management at construction sites have been performed manually, and there has been a problem of inefficiency.

In addition, in a large scale construction site, although the use of work management software allows the resource allocation to be done automatically, significant parts of processes are still required to be done manually thus there has been a problem that it requires a large amount of time for the allocation of resources using the work management software. As a result, an applicable range of the work management software has become very small, so that there has been a problem that it was not fully utilized.

Air compressors used for driving pneumatic tools are often seen at construction sites, but conventionally they don't provide data collection functions, and they have never been used for data collection purposes at construction sites.

DISCLOSURE OF THE INVENTION

Recognizing a fact that an air compressor is always available at a construction site, embodiments of the present invention provide an air compressor and a work management data collection system which are capable of automatically acquiring various data necessary for work management.

According to embodiments of the invention, an air compressor supplying compressed air to a pneumatic tool is provided with; a clocking unit for clocking time; a read and write unit reading and writing data through wireless communication from and to a storage medium having a wireless communication unit; and a controller for writing a time data clocked by the clocking unit into a worker data storage medium which is held by a worker as the storage medium, using the read and write unit when the read and write unit detects the worker data storage medium.

According to the embodiments of the invention, the controller may be configured so that, when the read and write unit detects a work condition storage medium, as the storage medium, on which a work condition setup data is stored, the controller reads out the work condition setup data using the read and write unit, and determines tardinesses and earlier leaves based on a starting time and a finishing time for each working day which is set based on the work condition setup data. Furthermore, the controller may be configured to operate. according to its start-up time and termination time set based on the work condition setup data.

According to the embodiments of the invention, the controller may be configured so that, when the read and write unit detects a tool identification data storage medium, as the storage medium, on which tool identification data identifying a type of pneumatic tool is stored, the controller reads out the tool identification data using the read and write unit to identify a tool, and writes the tool identification data and a working time data clocked by the clocking unit into the worker data storage medium using the read and write unit.

According to embodiments of the invention, the air compressor supplying compressed air to the pneumatic tool is provided with: the clocking unit for clocking time; the read and write unit for reading and writing data, through wireless communication, from and to a storage medium having a wireless communication unit; and the controller for identifying the tool by reading a tool identification data using the read and write unit when the read and write unit detects a tool identification data storage medium, as the storage medium, which stores the tool identification data identifying a type of the pneumatic tool, and writing the tool identification data and a working time data clocked by the clocking unit into a worker data storage medium, as the storage medium, which is held by a worker using the read and write unit.

According to the embodiments of the invention, a worker identification data identifying a work manager is stored on the worker data storage medium, and the controller may be configured so that, when the read and write unit detects the worker data storage medium, the controller reads out the worker identification data by the read and write unit to identify the work manager, and at the same time, it writes tool identification data and the working time data clocked by the clocking unit into the worker data storage medium of the work manager who has been identified by the worker identification data, using the read and write unit.

According to the embodiment of the invention, the pneumatic tool is provided with a consumable supply container which contains a consumable supply used during works and can be freely attached to and removed from the pneumatic tool, and the consumable supply container comprises a consumable supply data storage medium, as the storage medium, which stores a consumable supply identification data specifying a type of the consumable supply, and the controller may be configured so that, when it detects the consumable supply data storage medium by the read and write unit, reads out the consumable supply identification data using the read and write unit, and writes the tool identification data, the consumable supply identification data and a working time data clocked by the clocking unit into the worker data storage medium using the read and write unit.

Furthermore, according to embodiments of the invention, a work management data collection system collecting data necessary for work management is provided with: a pneumatic tool operated by a worker for carrying out works; and an air compressor supplying compressed air to the pneumatic tool; wherein the pneumatic tool comprises a tool identification data storage medium storing a tool identification data which identifies a type of the pneumatic tool; and the air compressor comprises; a clocking unit for clocking time; a read and write unit reading and writing data, through wireless communication, from and to a storage medium having a wireless communication unit; and a controller which reads out the tool identification data using the read and write unit to identify the tool, and writes the tool identification data and a working time data clocked by the clocking unit into a worker data storage medium, as the storage medium, held by a worker using the read and write unit when the read and write unit detects the tool identification data storage medium as the storage medium.

According to the embodiments of the invention, a worker identification data specifying a work manager is stored on the worker data storage medium, and the controller may be configured so that, when it detects the worker data storage medium by the read and write unit, it reads out the worker identification data using the read and write unit to identify the work manager, and at the same time, writes the tool identification data and a working time data clocked by the clocking unit into the worker data storage medium of the identified work manager using the read and write unit.

According to the embodiments of the invention, the pneumatic tool comprises a consumable supply container which contains a consumable supply used during works, and which can freely be attached to and removed from the system, wherein the consumable supply container comprises a consumable supply data storage medium, as the storage medium, storing a consumable supply identification data identifying a type of the consumable supply, and the controller may be configured so that, when it detects the consumable supply data storage medium by the read and write unit, it reads out the consumable supply identification data using the read and write unit, and writes the tool identification data, the consumable supply identification data and a working time data clocked by the clocking unit into the worker data storage medium using the read and write unit.

According to the embodiments of the invention, since time data may be written into the worker data storage medium held by the worker, it is possible to collect data of time-in and time-out etc. of the worker by using the worker data storage medium as a time card.

Furthermore, since a starting time and a finishing time may be set for each working day, it is possible to manage tardinesses and earlier leaves according to the changes in the starting times and finishing times. In addition, since it may be started up and terminated according to the starting time and finishing time, the running time may be managed in accordance with i.e. the hours during which the data needs to be collected.

According to the embodiments of the invention, by having workers carry out their works, any data necessary for work management may be collected, such as pneumatic tools used, types of consumable supplies used, and working hours etc.

According to the embodiments of the invention, by obtaining data necessary for work management using the air compressor and writing it into the worker data storage medium held by the worker, any data necessary for work management may be obtained from the storage medium used by the worker as a time card or the like.

In this way, the collection of data and input of the collected data and the like may be performed automatically, so that the time required for the resource allocation may be reduced drastically through the use of the work management software.

Other aspects and advantages of the invention will be apparent from the following description and the appended claims.

DESCRIPTION OF REFERENCE NUMERALS AND SIGNS

1: Air compressor, 2: RFID reader/writer, 3: time card, 4: RFID tag, 5: Pneumatic tool, 6: RFID tag, 7: Work management data collection system, 8: Driver, 8a: Motor, 9: Controller, 10: Antenna, 11: IC chip, 12: CPU, 13: Memory, 14: Timer, 15: Antenna, 16: IC chip, 16a: Memory, 17: Antenna, 18: IC chip, 18a: Memory, 19: Magazine, 20: RFID tag, 21: antenna, 22: IC chip, 22a: Memory, 23: Work condition setup card, 24: RFID tag, 25: Antenna, 26: IC chip, 26a: Memory

BEST MODE FOR CARRYING OUT THE INVENTION

Embodiments of the air compressor and work management data collection system according to the invention will now be explained with reference to the figures.

<Outline of Air Compressor and Work Management Data Collection System According to One Embodiment>

Figure 1:
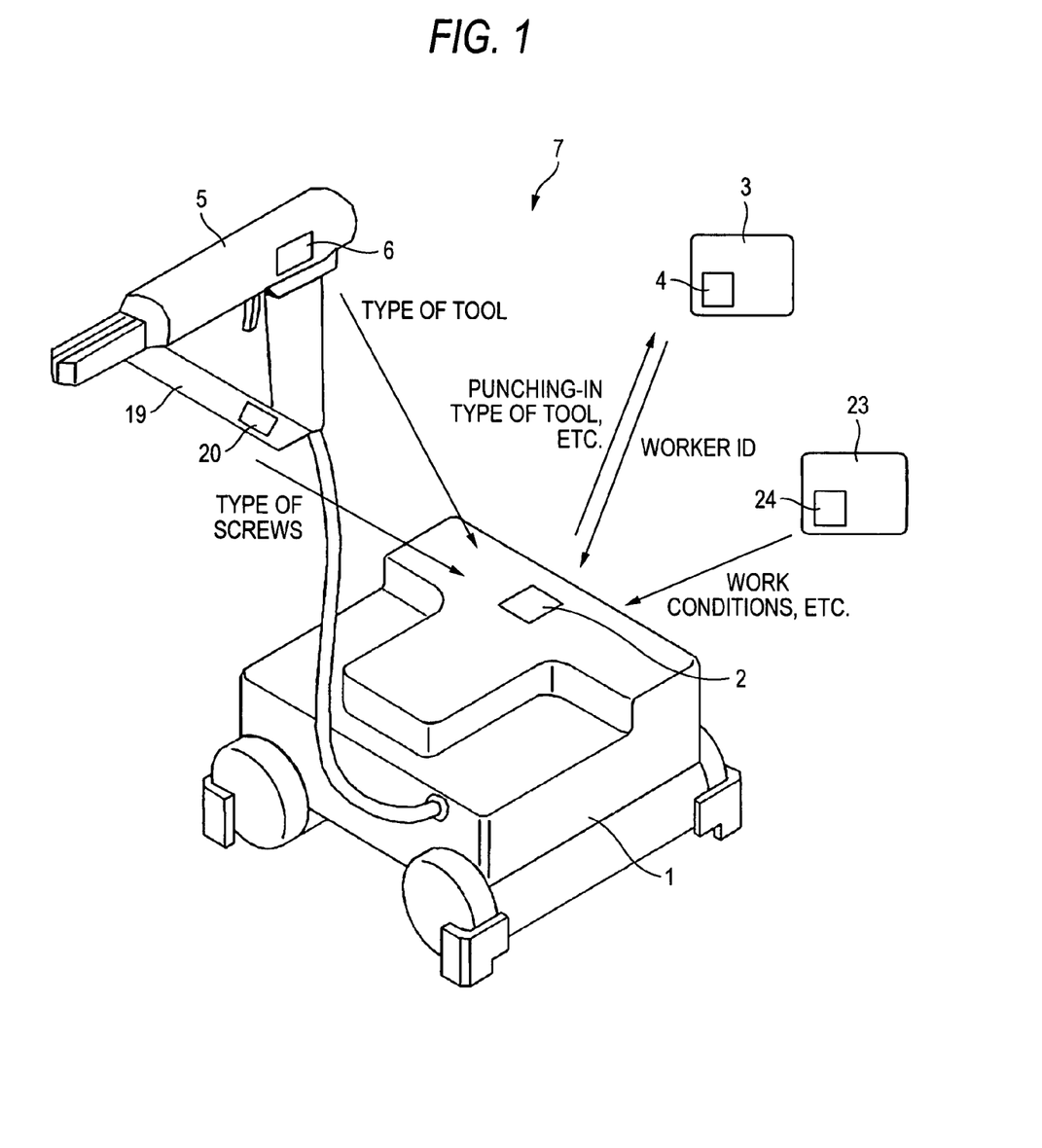
FIG. 1 is a block diagram showing an outline of an air compressor and a work management data collection system according to one embodiment.

FIG. 1 is a block diagram showing an outline of an air compressor and a work management data collection system according to one embodiment.

The air compressor 1 of the embodiment comprises a clocking mechanism provided by a later explained timer 14 and an RFID reader/writer 2, and it detects a time-in and a time-out, and writes the time data into an RFID tag 4 (wireless tag) provided on a time card held by a worker using the RFID reader/writer 2. In this way, the air compressor 1 is made to function as a time recorder, which is capable of collecting data necessary for management from time cards 3 of workers.

In addition, the air compressor 1 of the embodiment has a data collection mechanism which makes use of the clocking mechanism and the RFID reader/writer 2 etc. to read out a tool identification data and the like which identifies a type of the pneumatic tool 5 from an RFID tag 6 provided on the pneumatic tool 5. It also detects operating time and the like of the air compressor 1. By writing data into the time card 3 of a particular worker by the RFID reader/writer 2, data necessary for work management are read out from the time card 3 of the worker, thereby constituting a work management data collection system 7.

<Exemplary Configuration of Air Compressor and Work Management Data Collection System of the Embodiment>

Figure 2:
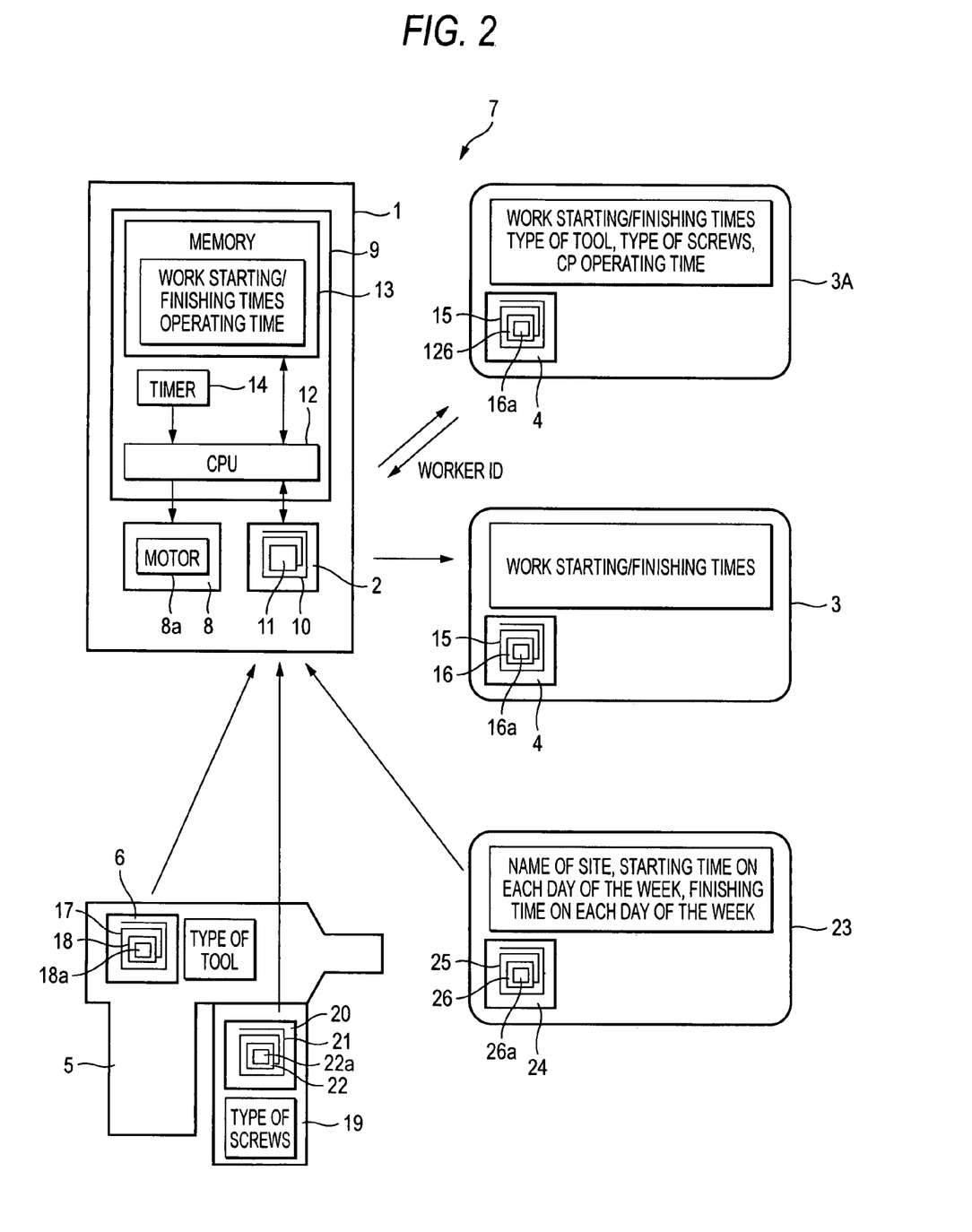
FIG. 2 is a functional block diagram showing an exemplary configuration of the air compressor and the work management data collection system according to the embodiment.

FIG. 2 is a functional block diagram showing an exemplary configuration of the air compressor and the work management data collection system according to the embodiment.

The air compressor 1 comprises the aforementioned RFID reader/writer 2, a drive mechanism 8 performing the compression of air and the ejection of the compressed air, a controller 9 performing control of, for example, the drive mechanism 8, and the like.

The RFID reader/writer 2 is one example of the read and write unit, and it has an antenna 10 and an IC chip 11 etc., and when an RFID tag moves closer thereto, it supplies power necessary for communication, and at the same time, establishes wireless communication therewith to read and write data.

For example, when the time card 3 is brought into a proximity of the air compressor 1 until. the RFID tag 4 of the time card 3 and the RFID reader/writer 2 come into a positional relationship which allows communication therebetween, writing of data and reading of data to and from the RFID tag 4 are performed via wireless communications.

Furthermore, when the pneumatic tool 5 is brought into a proximity of the air compressor 1, and the RFID tag 6 of the pneumatic tool 5 and the RFID reader/writer 2 come into a positional relationship which allows communication therebetween, writing of data and reading of data to and from the RFID tag 6 are performed via wireless communications.

The drive mechanism 8 comprises amotor 8a etc. as a driving source of air compression, and the motor 8a is driven so as to retain a predetermined value of a pressure inside an air tank not shown, for example.

The controller 9 comprises a CPU 12, a memory 13 such as EEPROM, and a timer 14. The CPU 12 is an example of the controller, which controls the driving of the motor 8a, and at the same time, performs input and output of data through the RFID reader/writer 2 and storing of data into the memory 13 etc. The CPU 12 detects times-in and times-out of workers by the timer 14 which is an exemplary clocking unit. It also detects the operating time of the air compressor by the timer 14.

The time card 3 held by each worker is one example of the worker data storage medium, and the RFID tag 4 comprises an antenna 15 and an IC chip 16 which constitutes a wireless communication unit. When the time card 3 is brought into a proximity of the RFID reader/writer 2 of the air compressor 1, the RFID tag 4 is recognized by the RFID reader/writer 2 and starts receiving power supply and transmitting wirelessly from the antenna 15 the data stored within a memory 16a of the IC chip, as well as storing the data received by the antenna 15 into the memory 16a of the IC chip 16.

The time card 3 has an ID code etc. given to each worker, as the worker identification data, which is stored in the memory 16a in the RFID tag 4. Furthermore, times-in and times-out are also stored as the time data.

In addition, on the time card 3A such as one for a foreman etc., as the work manager, in addition to the aforementioned data, the operating time etc. of the air compressor 1 is stored as the working time data. Also, as for the tool identification data, a type of the pneumatic tool 5 etc. is stored.

The pneumatic tool 5 may be a screwing machine for driving screws in, for example, which is connected to the air compressor 1 to receive the supply of compressed air, and performs screwing works by using the compressed air as its source of driving power. As for the tool, it may also be a nailing machine, for example.

The RFID tag 6 of the pneumatic tool 5 is one example of the tool identification data storage medium, and it comprises an antenna 17 and an IC chip 18 etc., and a type of the pneumatic tool and the like are stored in a memory 18a of the IC chip 18 as a tool identification data.

When the pneumatic tool 5 is brought into a proximity of the RFID reader/writer 2, the RFID tag 6 is recognized by the RFID reader/writer 2 and starts receiving power supply from the RFID reader/writer 2 and transmitting wirelessly from the antenna 17 the data stored within a memory 18a of the IC chip 18.

The pneumatic tool 5 comprises a magazine 19 dispensably holding screws, not shown in the figure. The magazine 19 is one example of the consumable supply container, which is configured so that it can be freely attached and removed to and from the pneumatic tool 5, and it comprises an RFID tag 20.

The RFID tag 20 is one example of the consumable supply data storage medium, which comprises an antenna 21 and an IC chip 22, and within a memory 22a of the IC chip 22, a type of screw contained and the like are stored as the consumable supply identification data.

When the pneumatic tool 5 equipped with the magazine 19 is brought into a proximity of the RFID reader/writer 2 of the air compressor 1, the RFID tag 20 is recognized by the RFID reader/writer 2 and starts receiving power supply from the RFID reader/writer 2 and transmitting wirelessly from the antenna 21 the data stored within the memory 22a of the IC chip 22.

As explained heretofore, by providing the RFID reader/writer 2 to the air compressor 1, and the RFID tags to the time card 3, the pneumatic tool 5 connected to the air compressor 1, and the magazine 19 equipped to the pneumatic tool 5, the work management data collection system 7 performing input and output of data using the air compressor 1 is constituted.

Furthermore, the work management data collection system 7 having the configuration explained above comprises a work condition setup card 23, since the work conditions are specified with respect to each working day, and each working site.

The work condition setup card 23 is one example of the work condition storage medium, and it comprises a RFID tag 24. The RFID tag 24 comprises an antenna 25 and an IC chip 26, and a memory 26a of the IC chip 26 stores a site name and a starting time and a finishing time etc. for each of working days.

When the work condition setup card 23 is brought into a proximity of the RFID reader/writer 2 of the air compressor 1, the RFID tag 24 is recognized by the RFID reader/writer 2 and starts receiving power supply from the RFID reader/writer 2 and transmitting wirelessly from the antenna 25 the data stored within a memory 26a of the IC chip 26.

<Exemplary Operation of Air Compressor and Work Management Data Collection System>

Figure 3:
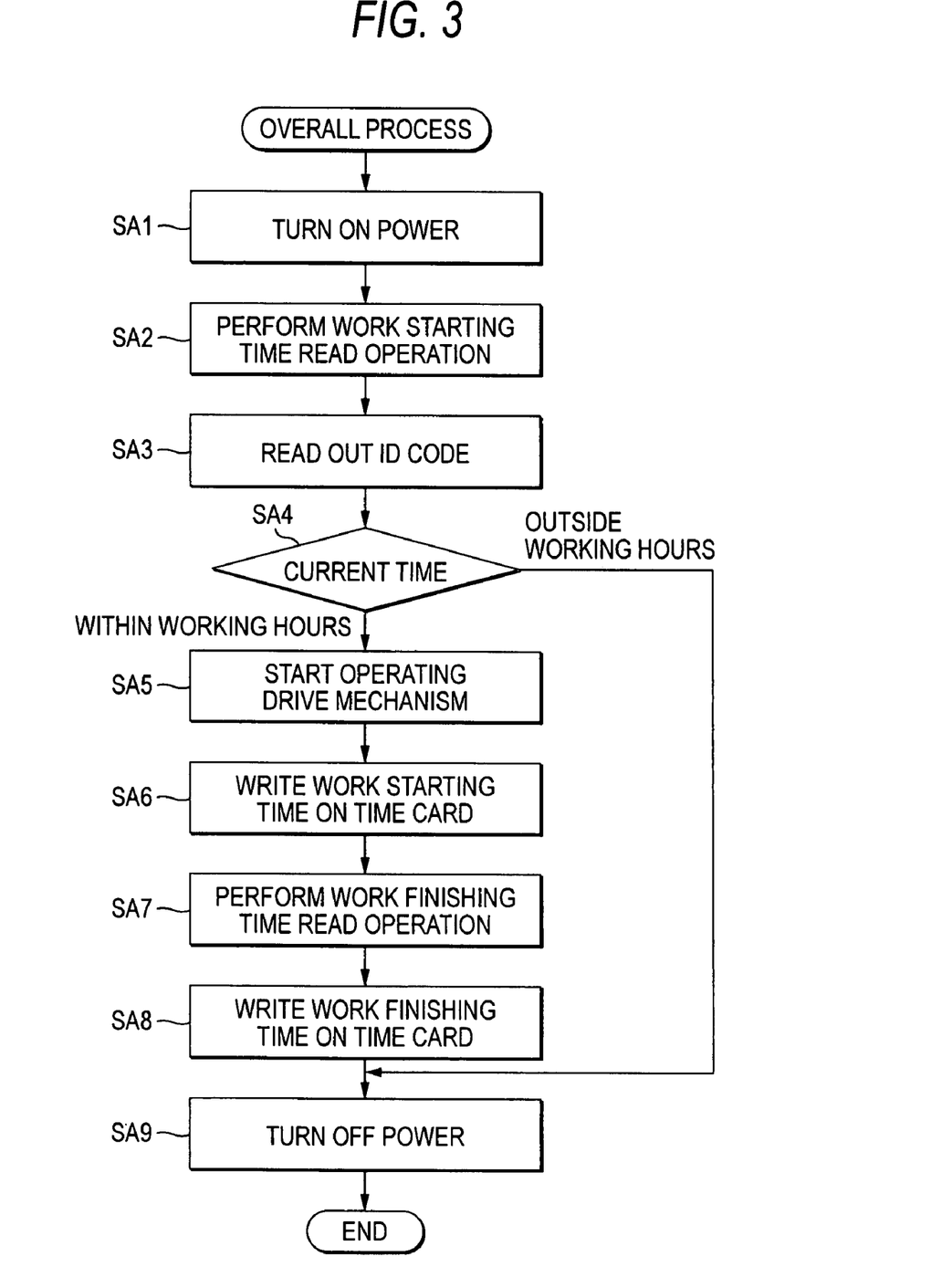
FIG. 3 is a flow chart showing steps of the overall process of the air compressor according to the embodiment.

FIG. 3 is a flow chart showing a flow of the overall process of the air compressor according to the embodiment, which will explain, at first, the overall operations of the air compressor 1 starting from starting-up to operating as a time recorder, and then to terminating.

Step SA1: A worker turns on the power of the air compressor 1. The controller 9 of the air compressor 1 starts its operation upon the power-on. Here, in the flow chart shown in FIG. 3, it is assumed that a foreman is operating it as the worker.

Step SA2: The foreman holds his time card 3A over the RFID reader/writer 2 of the air compressor 1 to invoke the reading behavior of a work starting time.

Step SA3: The CPU 12 of the air compressor 1 starts communication using the RFID reader/writer 2 when the RFID reader/writer 2 recognizes the time card 3A, and reads out the worker identification data (ID code) from an RFID tag 4 of the time card to identify the foreman.

Step SA4: The CPU 12 of the air compressor 1 determines whether or not the current time is within predetermined working hours. The condition setting of i.e. the working hours will later be explained.

Step SA5: When the worker identification data identifies the foreman to be a legitimate one, and the current time is determined to be within the working hours, the drive mechanism 8 starts operating. In this way, any individuals other than legitimate workers cannot operate the air compressor 1, so that an antitheft measure may be implemented.

Also, by making the air compressor 1 disabled except during predetermined working hours to discourage any operations during days and hours which may cause claims from neighbors who live near the construction site, such as during holidays and midnights.

Step SA6: The CPU 12 of the air compressor 1 detects, using the timer 14, a time at which the reading behavior of the work starting time has been performed, and communicates using the RFID reader/writer 2 to write the work starting time into the RFID tag 4 of the time card 3A as a time-in.

Step SA7: When, i.e. the works of the day are done, the foreman holds the time card 3A over the RFID reader/writer 2 of the air compressor 1 to invoke the reading behavior of a work finishing time.

Step SA8: When the RFID reader/writer 2 recognizes the time card 3A, the CPU 12 of the air compressor 1 detects a time using the timer 14 and starts communication using the RFID reader/writer 2 to write the work finishing time, as a time-out, into the RFID tag 4 of the time card 3A.

Step SA9: When the power of the air compressor is turned off, the air compressor 1 stops operating the drive mechanism 8 and the controller 9.

Figure 4:
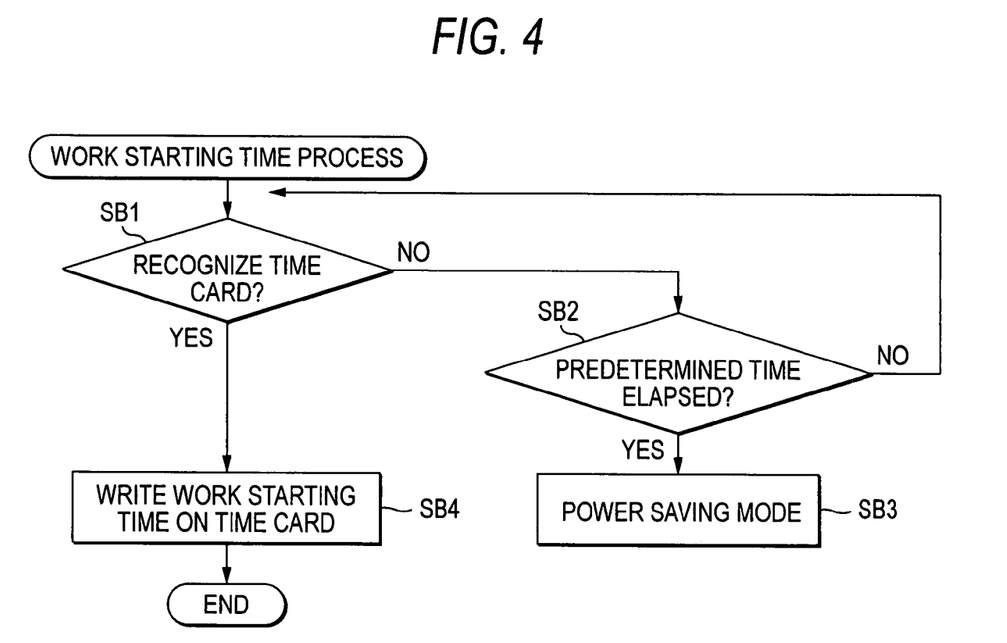
FIG. 4 is a flow chart showing process steps at the work starting time of the air compressor according to the embodiment.
Figure 5:
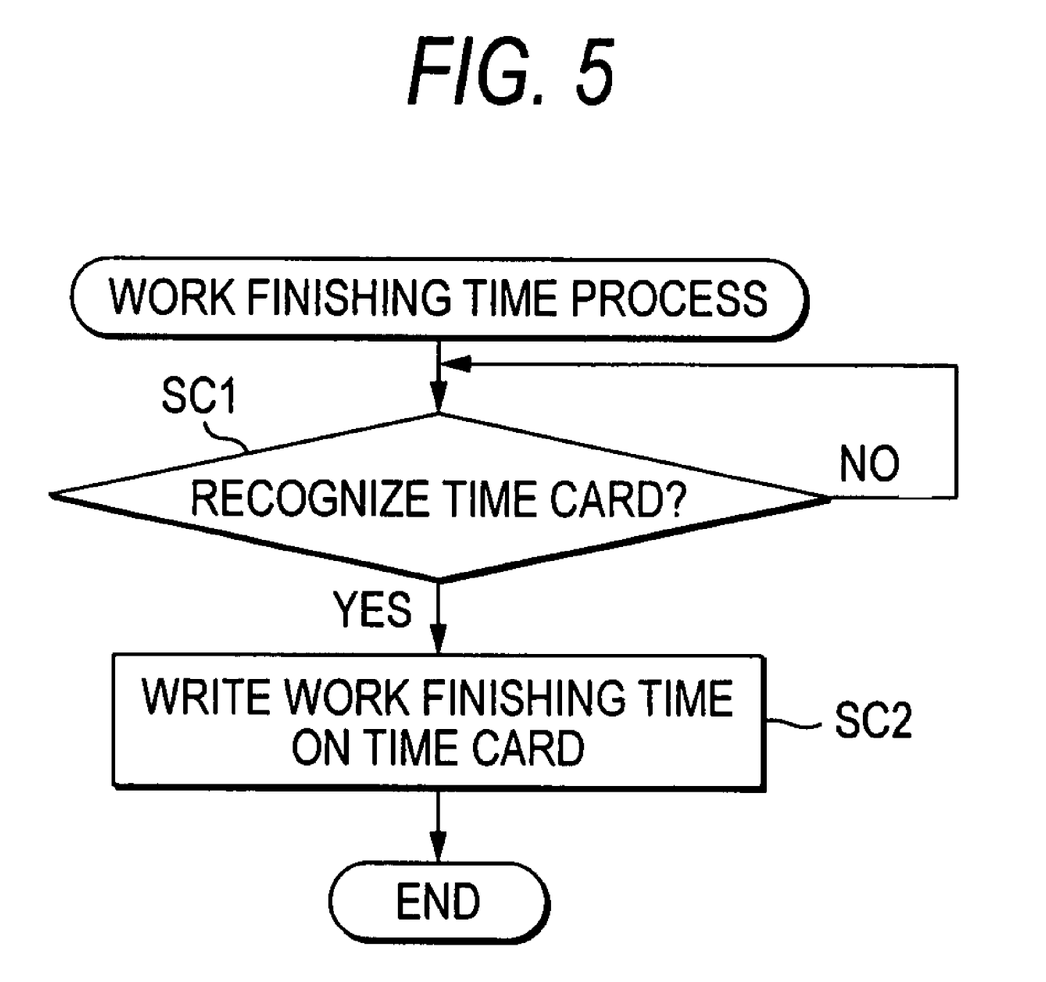
FIG. 5 is a flow chart showing process steps at the work finishing time of the operation of the air compressor according to the embodiment.

FIG. 4 is a flow chart showing a flow of steps at the start of the operation of the air compressor according to the embodiment, and FIG. 5 is a flow chart showing a flow of steps at the end of the operation of the air compressor 1 according to the embodiment. Explained below are the behaviors of workers other than the foreman to have the air compressor 1 of the embodiment function as the time recorder.

First, with reference to FIG. 4, the behaviors in the steps at the work starting time will be explained. Step SB1: After starting the drive mechanism 8 by i.e. the step explained in Step SA5 with reference to FIG. 3, the CPU 12 of the air compressor 1 determines whether or not the RFID reader/writer 2 has recognized an RFID tag 4 of any time card 3.

Step SB2: When the RFID reader/writer 2 has not recognized any RFID tag of a time card 3, the CPU 12 of the air compressor 1 determines whether or not a predetermined time has elapsed.

Step SB3: In the decision of the Step SB2, any RFID tag 4 of a time card 3 is not yet recognized after the predetermined time has elapsed since the start of the drive mechanism 8, it is determined that there is no worker present and the mode is switched into a power saving mode. In the power saving mode, for example, the drive mechanism 8 is halted and the generation of compressed air stops. The controller 9 is capable of restarting upon recognition of an RFID tag 4 of a time card 3 at Step SB1 or the like, even when it is in the power saving mode.

Step SB4: When the RFID reader/writer 2 recognizes an RFID tag 4 of a time card 3, the CPU 12 of the air compressor 1 detects a time using the timer 14 and starts communication using the RFID reader/writer 2 to write the work starting time into the RFID tag 4 of the time card 3 as a time-in.

Next, with reference to FIG. 5, the behaviors in the steps at the work finishing time will be explained. Step SC1: The CPU 12 of the air compressor 1 determines whether or not the RFID reader/writer 2 recognized an RFID tag 4 of a time card 3.

Step SC2: When the RFID reader/writer 2 recognizes an RFID 4 of a time card 3, the CPU 12 of the air compressor 1 detects a time using the timer 14, and communicates using the RFID reader/writer 2 to write the work finishing time into the RFID tag 4 of the time card 3 as a time-out.

The presence or absence of tardinesses and earlier leaves may be determined based on i.e. the foreman's punch-in times (time-in and time-out) explained with reference to FIG. 3. They may also be determined based on predetermined starting and finishing times.

Figure 6:
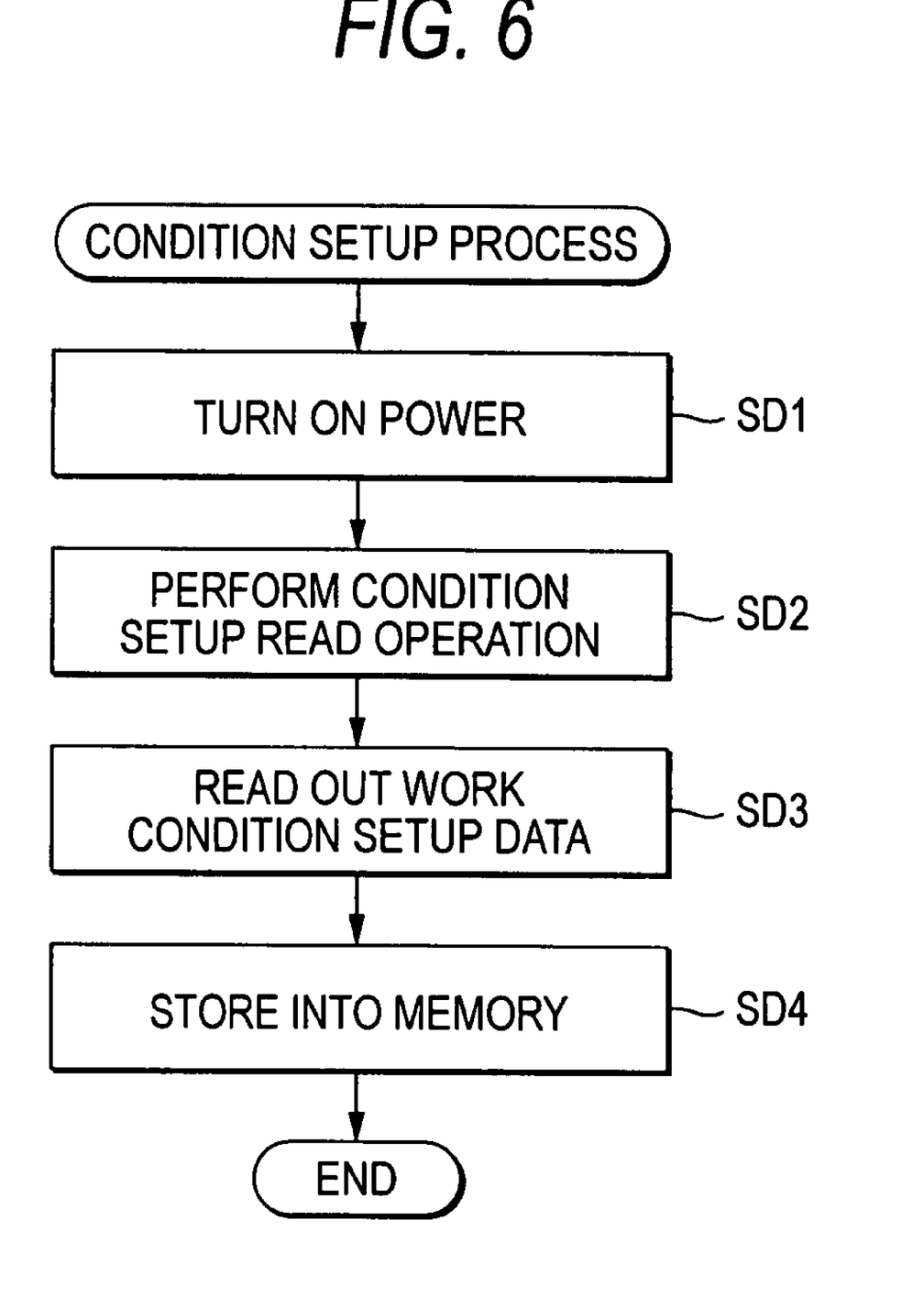
FIG. 6 is a flow chart showing process steps at the time of condition setup of the air compressor according to the embodiment.

FIG. 6 is a flow chart showing a flow of steps at the time of condition setup of the air compressor of the embodiment. The operations to perform the condition setup such as working hours will now be explained.

Step SD1: The foreman turns on the power of the air compressor 1.

Step SD2: The foreman holds the work condition setup card 23 over the RFID reader/writer 2 of the air compressor 1 to invoke the reading behavior for the condition setup.

Step SD3: When the RFID reader/writer 2 recognizes the work condition setup card 23, the CPU 12 of the air compressor 1 starts communication using the RFID reader/writer 2 to read out various work condition setup data from the RFID tag 24 of the work condition setup card 23.

Step SD4: The CPU 12 of the air compressor 1 stores the various work condition setup data read out from the RFID tag 24 of the work condition setup card 23 into the memory 13, and sets up the work conditions.

As for the work condition setup data stored are, for example, a name of a site, and a starting time and a finishing time of each working day. In this way, the site where the air compressor 1 is installed may be identified, and by writing the time data and the name of the site together in a corresponding manner into the RFID tag 4 at the time of punching-in on the time card 3, the single time card 3 may be used in a plurality of sites.

By writing the name of the site into the RFID tag 4 of the time card 3 in advance, it is also possible for a single worker to have a plurality of time cards 3 one each for each of the sites.

Also, by setting starting times and finishing times, it is possible to determine tardinesses and early leaves, and at the same time, by setting a starting time and a finishing time for each working day, any changes in working hours etc. may easily be accommodated.

In addition, by setting the start-up time and termination time of the drive mechanism 8 in synchronization with the starting time, finishing time and break times etc., it is possible to start up the drive mechanism 8 automatically according to the working hours, and to halt the operation of the drive mechanism 8 automatically during hours when no works are carried out, thereby preventing any unnecessary operation, as well as noise from being generated.

In a case where a motor which is inverter-driven by an inverter control circuit is used for the drive mechanism 8, by stopping the supply of power to the inverter circuit, unnecessary power consumption may be reduced, and at the same time, the operating life of the inverter circuit may be increased.

It is also possible to combine the function of the work condition setup card 23 with that of the time card 3A of the foreman, by storing into the time card 3A of the foreman, the various work condition setup data stored on the work condition setup card 23.

Figure 7:
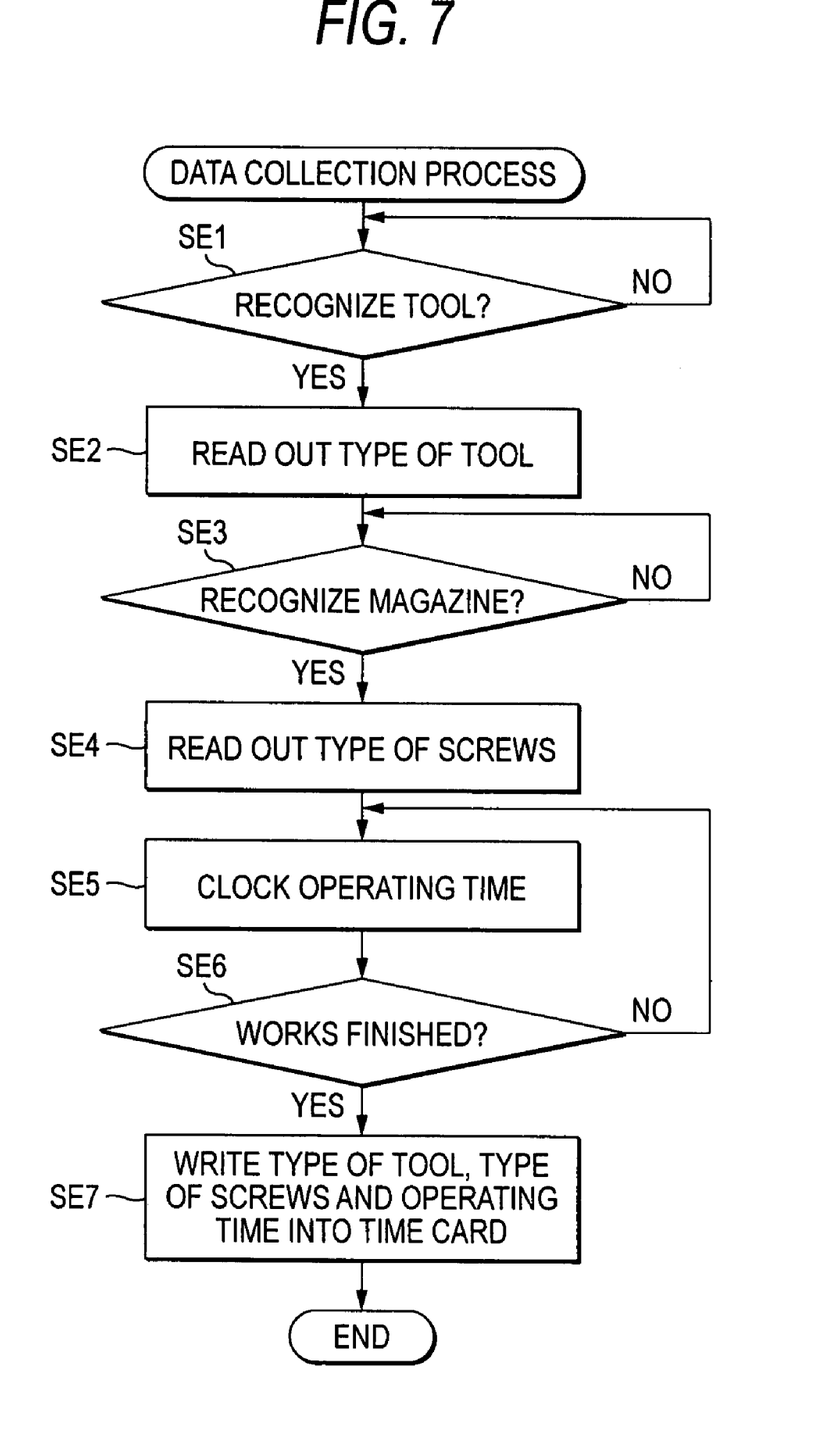
FIG. 7 is a flow chart showing process steps of work management data collection system according to the embodiment.

FIG. 7 is a flow chart showing process steps of a work management data collection system according to the embodiment. The operations of the work management data collection system which employs the air compressor of the embodiment will now be explained.

Step SE1: After operating the drive mechanism 8 in the process step explained in Step SA5 of FIG. 3 for example, the CPU 12 of the air compressor 1 determines whether or not the RFID reader/writer 2 has recognized an RFID tag 6 of a pneumatic tool 5.

Step SE2: When the RFID reader/writer 2 recognizes the RFID tag 6 of the pneumatic tool 5 as the pneumatic tool 5 is brought into its proximity, the CPU 12 of the air compressor 1 starts communication using the RFID reader/writer 2, and reads out a tool identification data identifying a type of the pneumatic tool 5 from the RFID tag 6 of the pneumatic tool 5 and stores it into the memory 13.

Step SE3: The CPU 12 of the air compressor 1 determines whether or not the RFID reader/writer 2 recognizes an RFID tag 20 of a magazine 19 attached to the pneumatic tool 5.

Step SE4: When the RFID reader/writer 2 recognizes the RFID tag 20 of the magazine 19 as the magazine is brought into its proximity, the CPU 12 of the air compressor 1 starts communication using the RFID reader/writer 2 and reads out a consumable supply identification data identifying a supply used, namely in this example, a type of screws, and stores the data into the memory 13.

Step SE5: When the drive mechanism 8 is in operation, the CPU 12 of the air compressor 1 detects time using the timer 14 and keeps clocking the working hours.

Step SE6: The CPU 12 of the air compressor 1 determines whether or not specified operations have been performed and the works have been terminated. When the works have not been terminated, it continues clocking the working hours.

Step SE7: When the CPU 12 of the air compressor 1 determines that the works have been terminated, it starts communication using the RFID reader/writer 2 and writes into the RFID tag 4 of the worker's, in this example, the foreman's time card 3A the, data indicating the type of the tool and the type of the screws stored the memory 13 and the working hours of the air compressor 1.

The above-mentioned operations complete storing of the type of the pneumatic tool 5, the type of the screws, and the working hours into the time card 3A of the foreman who used the air compressor 1.

In this way, by downloading the data on the time card 3A of the foreman into a computer in which the work management software has been installed, automatic acquisition of necessary data for work management may be realized.

Although, in the above description, the RFID tags are used for inputting and outputting the data, it is also possible to use storage media such as USB memories or the like. However, the use of RFID is suitable because the use of the RFID tags allows data to be inputted and outputted over wireless communications.

Also in the above embodiment, the magazine 19 was configured so as to be freely attached to and removed from the pneumatic tool 5, however, the magazine may also be the one provided integrally with the pneumatic tool. In this case, the consumable supply, such as screws and nails, loaded into the magazine shall be provided in combination with an RFID tag corresponding to the consumable supply, and when the consumable supply is newly loaded into the magazine, the RFID tag which comes along the consumable supply may be adhered onto the magazine. An FRID tag of the consumable supply that has completely been consumed may be removed from the magazine for disposal.

Furthermore, as mentioned in the above embodiment, in the air compressor 1 embodying the invention, the operation of the air compressor 1 is limited if the recognition of the time card has not been done correctly. Accordingly, even if the air compressor is carried off by a third person from its working site, it is difficult for the third person, who does not have a legitimate time card, to actuate the air compressor's original functions and use it, so that there also is an antitheft effect of the air compressor 1 as a subsidiary effect.

The invention has been explained in detail with reference to particular embodiments, however, it is apparent for a person skilled in the art that various modification and changes are possible without departing from the spirit and scope of the invention.

The present application is based on the Patent Application No. 2005-043123 filed on Feb. 18, 2005 the contents of which is incorporated herein by reference.

INDUSTRIAL APPLICABILITY

The invention is applicable to a system which collects data at a construction site or the like where workers do their jobs using pneumatic tools etc.

The invention claimed is:

1. An air compressor for supplying compressed air to a pneumatic tool, the air compressor comprising:
   a clocking unit configured to clock time;
   a read and write unit configured to read and write data through wireless communications to and from a storage medium having a wireless communication unit; and
   a controller configured to write a time data clocked by the clocking unit into a worker data storage medium using the read and write unit, when the read and write unit detects the worker data storage medium held by a worker as the storage medium, and when the read and write unit detects a tool identification data storage medium as the storage medium on which a tool identification data identifying a type of the pneumatic tool is stored, the controller identifies the tool by reading out the tool identification data using the read and write unit, and writes the tool identification data and a working time data clocked by the clocking unit into the worker data storage medium using the read and write unit, wherein
   the pneumatic tool comprises a consumable supply container accommodating a consumable supply comprised of fasteners to be used during works and being attachable to and detachable from a body of the pneumatic tool;

the consumable supply container comprises a consumable supply data storage medium as the storage medium storing a consumable supply identification data identifying a type of the fasteners; and when the read and write unit detects the consumable supply data storage medium, the controller reads out the consumable supply identification data using the read and write unit, and writes the tool identification data, the consumable supply identification data, and a working time data clocked by the clocking unit into the worker data storage medium using the read and write unit.

2. The air compressor according to claim 1, when the read and write unit detects a work condition storage medium as the storage medium on which a work condition setup data is stored, the controller reads out the work condition setup data using the read and write unit, and determines tardinesses and early leaves based on a starting time and a finishing time for each working day which are set according to the work condition setup data.

3. The air compressor according to claim 2, wherein the controller operates according to a start-up time and a termination time that are set according to the work condition setup data.

4. The air compressor according to claim 1, wherein a worker identification data identifying a work manager is stored on the worker data storage medium; and when the read and write unit detects the worker data storage medium, the controller reads out the worker identification data using the read and write unit to identify the work manager, and stores the tool identification data and a working time data clocked by the clocking unit into the worker data storage medium of the work manager identified by the worker identification data using the read and write unit.

5. A work management data collection system for collecting necessary data for work management, the work management data collection system comprising:

a pneumatic tool operated by a worker for carrying out works; and an air compressor configured to supply compressed air to the pneumatic tool;

wherein the pneumatic tool comprises a tool identification data storage medium configured to store a tool identification data identifying a type of the pneumatic tool;

the air compressor comprising;

a clocking unit configured to clock time;

a read and write unit configured to read and write data through wireless communication to and from a storage medium having a wireless communication unit; and a controller configured to read the tool identification data using the read and write unit to identify the tool when the read and write unit detects the tool identification data storage medium as the storage medium, and write the tool identification data and a working time data clocked by the clocking unit into a worker data storage medium held by a worker as the storage medium using the read and write unit, wherein the pneumatic tool comprises a consumable supply container accommodating a consumable supply comprised of fasteners to be used during works and being attachable to and removable from a body of the pneumatic tool;

the consumable supply container comprises a consumable supply data storage medium as the storage medium storing a consumable supply identification data identifying a type of the fasteners; and when the read and write unit detects the consumable supply data storage medium, the controller reads out the consumable supply identification data using the read and write unit, and writes the tool identification data, the consumable supply identification data, and a working time data clocked by the clocking unit into the worker data storage medium using the read and write unit.

6. The work management data collecting system according to claim 5, wherein a worker identification data identifying a work manager is stored on the worker data storage medium; and when the read and write unit detects the worker data storage medium, the controller reads out a worker identification data using the read and write unit to identify the work manager, and writes the tool identification data and a working time data clocked by the clocking unit into the worker data storage medium of the work manager identified by the worker identification data using the read and write unit.

* * * * *